(12) United States Patent
Conrard et al.

(10) Patent No.: US 7,317,466 B2
(45) Date of Patent: Jan. 8, 2008

(54) STRIP CHART TEMPERATURE RECORDER WITH MOVABLE BI-METALLIC ELEMENT ASSEMBLY

(75) Inventors: John Conrard, Redmond, WA (US); David B. Walters, Everett, WA (US)

(73) Assignee: Sensitech, Inc., Beverly, MA (US)

( * ) Notice: Subject to any disclaimer, the term of this patent is extended or adjusted under 35 U.S.C. 154(b) by 340 days.

(21) Appl. No.: 10/979,982

(22) Filed: Nov. 3, 2004

(65) Prior Publication Data

US 2006/0092190 A1    May 4, 2006

(51) Int. Cl.
G01D 15/16    (2006.01)
G01D 9/00    (2006.01)

(52) U.S. Cl. .................... 346/121; 346/68; 346/136

(58) Field of Classification Search ............. 346/112, 346/25, 121, 136, 68
See application file for complete search history.

(56) References Cited

U.S. PATENT DOCUMENTS 3,787,885 A * 1/1974 Johnson .................. 346/136
3,868,697 A * 2/1975 Schefe ...................... 346/68
4,755,063 A * 7/1988 Nakagawa et al. ......... 374/186
4,926,192 A * 5/1990 Stires et al. ............... 346/136

* cited by examiner

Primary Examiner—Manish S. Shah
(74) Attorney, Agent, or Firm—Wolf, Greenfield & Sacks P.C.

(57) ABSTRACT

One embodiment of the invention is directed to a method of creating and maintaining a calibrated bi-metallic element assembly configuration in a strip chart recorder including a housing having top and bottom portions. The method includes acts of positioning a bi-metallic element assembly on the bottom portion of the housing while the housing is in an open configuration, closing the housing, and attaching the bi-metallic element assembly to the top portion of the housing when the housing is closed. Another embodiment of the invention is directed to a strip chart recorder, including a housing comprising top and bottom portions, the top portion of the housing having a first mating feature, a bi-metallic element assembly having a second mating feature, and a strip chart positioned on the bottom portion of the housing. The first and second mating features are adapted to engage each other upon closing of the housing.

13 Claims, 6 Drawing Sheets

STRIP CHART TEMPERATURE RECORDER WITH MOVABLE BI-METALLIC ELEMENT ASSEMBLY

FIELD OF THE INVENTION

The present invention relates generally to devices for detecting and indicating temperature-related or other environmental conditions.

BACKGROUND

Strip chart recorders are used to record changes in signals, and commonly comprise a strip of paper that is passed beneath a stylus coupled to a sensor. As a signal monitored by the sensor changes, the stylus deflects in relation to the signal change, generating markings that form a record of the sensor changes on the strip of paper. Strip chart recorders are well suited for recording continuous signals, such as temperature or another environmental condition. Changes in the signal may be observed and/or archived by removing the marked strip of paper, or a portion thereof, from the strip chart recorder.

A common mechanism used to deflect the stylus of a strip chart recorder in response to temperature is a bi-metal coil. According to one exemplary implementation of a bi-metal coil, the coil comprises two metals laminated together, each having a particular rate of expansion in response to temperature. When the coil is heated or cooled, the high expansion metal on the coil expands or contracts more than the low expansion metal of the coil, which causes the coil to move in relation to the temperature changes. The stylus may be attached to the center of the coil so that it deflects as the coil winds and unwinds. The stylus generates markings indicative of the angular relationship of the deflection on a strip chart. The chart is pulled under the stylus by a gear motor that incorporates a timing element to create a running record over time of the temperature events.

The strip chart may be reviewed to determine the temperature conditions over a recorded period. For example, a strip chart recorder may be used to record the temperature conditions of a item or group of items during transit. Such items may be sensitive to temperature or an elapsed time at a temperature, such as products intended for human use or consumption (e.g., foods and food-related products, beverages, medicines, cosmetics, etc.). By reviewing the strip chart, a user can determine whether the items have been exposed to undesirable temperature conditions (e.g., inadvertent freezing or thawing, extreme heat or cold, time spent outside of a particular desirable temperature range, undesirable temperature cycles or fluctuations, etc.).

SUMMARY

One embodiment of the invention is directed to a method of creating and maintaining a calibrated bi-metallic element assembly configuration in a strip chart recorder comprising a housing having top and bottom portions. The method comprises acts of positioning a bi-metallic element assembly on the bottom portion of the housing while the housing is in an open configuration, closing the housing, and attaching the bi-metallic element assembly to the top portion of the housing when the housing is closed.

Another embodiment of the invention is directed to a strip chart recorder, comprising a housing comprising top and bottom portions, the top portion of the housing comprising a first mating feature, a bi-metallic element assembly comprising a second mating feature, and a strip chart positioned on the bottom portion of the housing. The first and second mating features are adapted to engage each other upon closing of the housing.

A further embodiment of the invention is directed to a method of facilitating removal of a strip chart from a strip chart recorder, the strip chart recorder comprising a housing and a bi-metallic element assembly that comprises a bi-metallic element and stylus. The method comprises an act of moving the bi-metallic element assembly of the strip chart recorder with respect to the strip chart while maintaining a calibrated configuration of the bi-metallic element assembly. The act of moving the bi-metallic element assembly comprises moving the bi-metallic element assembly from a first position in which the bi-metallic element assembly at least partially obstructs access to the strip chart to a second position in which the bi-metallic element assembly does not obstruct access to the strip chart.

DETAILED DESCRIPTION

Applicants have appreciated that a drawback associated with existing strip chart recorders is that the recorder may be damaged when a portion of the strip chart is removed from the recorder, causing the recorder to become un-calibrated. For example, since the stylus in conventional strip chart recorders partially obscures (e.g., physically obstructs) the strip chart, the stylus may be bent or otherwise damaged during removal of a section of the strip chart, disturbing the calibrated configuration of the stylus and bi-metallic element. If this occurs, it may be impossible to verify the performance of the recorder after a chart has been generated.

When strip chart recorders are used to record the environmental conditions of items in transit, such performance verification is typically performed during a post-trip calibration.

Accordingly, one aspect of the invention is directed to a strip chart recorder wherein the stylus may be reoriented relative to the strip chart so that the strip chart may be removed without disturbing the stylus or other portions of the recorder. The stylus may be moved in conjunction with the bi-metallic element of the strip chart recorder, such that the calibrated configuration of the bi-metallic element and stylus can be maintained. According to one exemplary implementation, the bi-metallic element and stylus are initially positioned on a portion of the housing adjacent to the strip chart, and are subsequently attached to an opposite portion of the housing. Thus, when the housing is opened to retrieve the strip chart, the bi-metallic element and stylus do not obscure the strip chart and will not be disturbed. In addition, the bi-metallic element and stylus may be operable in their calibrated configuration once the housing is returned to the closed position wherein the bi-metallic element and stylus are again adjacent to the strip chart.

An exemplary configuration of a strip chart recorder is illustrated in FIGS. 1-7. An overview of the structure of the strip chart recorder will be described in connection with FIG. 1. An initial configuration of the strip chart recorder, wherein the strip chart recorder is open for assembly, will be described in connection with FIG. 2. Another configuration of the strip chart recorder, wherein the strip chart recorder is closed for operation, will be described in connection with FIGS. 3-5. A further configuration of the strip chart recorder, wherein the strip chart is open for removal or inspection of the strip chart, will be described in connection with FIGS. 6 and 7.

Figure 1:
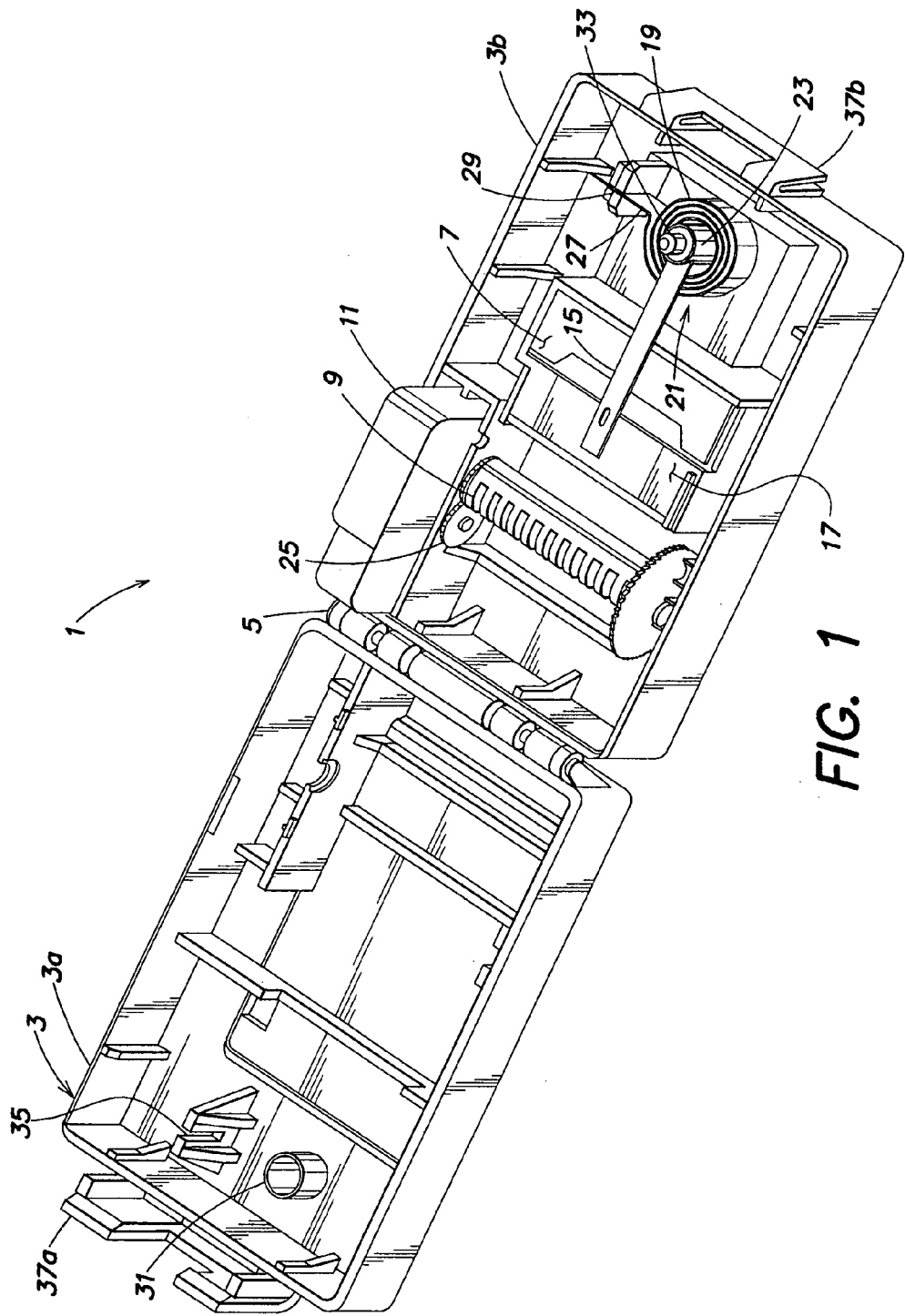
FIG. 1 is a perspective view of a strip chart recorder according to an exemplary embodiment of the invention.

FIG. 1 illustrates an exemplary implementation of a strip chart recorder according to an embodiment of the invention. Strip chart recorder 1 comprises a housing 3 having a top portion 3a and a bottom portion 3b coupled together by a hinge 5. It should be appreciated that while portions 3a and 3b of the housing are referred to herein as the "top" and "bottom" portions of the housing, respectively, top portion 3a need not be positioned above bottom portion 3b when strip chart recorder 1 is in use. Rather, top portion 3a and bottom portion 3b are denoted as such merely for convenience in referring to the portions of the housing.

A chart dispenser 7 is coupled to bottom portion 3b of housing 3 to dispense a strip chart (not shown in FIG. 1). As it is dispensed, the strip chart is advanced over a platen 17 and wound around a spool 9. An end of the strip chart may be coupled to spool 9 to facilitate the winding. A gear train 25 couples spool 9 to a motor and associated power source 11 to power the rotation of spool 9. The power source may include as one or more batteries, according to one exemplary implementation.

A bi-metallic element assembly 21 is arranged to record markings on the strip chart in response to a sensed temperature. Bi-metallic element assembly 21 comprises a stylus 15 and a bi-metallic element 19 coupled together by an arbor 23. Stylus 15 is oriented to generate markings on the strip chart as it advances over platen 17, and may be implemented as a pen or other marking implement. In the exemplary implementation of FIG. 1, bi-metallic element 19 comprises a coiled bi-metallic strip. The two metals of the strip are laminated or otherwise joined together, and have different rates of expansion in response to temperature. As a result, bi-metallic element 19 unwinds and winds in response to increases and decreases in temperature. Stylus 15 is attached to the center of bi-metallic element 19 by arbor 23 so that it deflects as the bi-metallic element unwinds and winds. Stylus 15 generates markings indicative of the angular relationship of the deflection on a strip chart. Bi-metallic element 19 includes a dead band 27, which serves as a reference to locate a portion of bi-metallic element 19 with respect to stylus 15 so that the markings on the strip chart occur in a desired and predictable manner. A slot 29 is provided on bottom portion 3b of housing 3 to secure and position dead band 27 with respect to bottom portion 3b.

It should be appreciated that the implementation of bi-metallic element assembly 21 shown in FIG. 1 is merely exemplary, and that other implementations of bi-metallic element assembly 21 are possible. For example, stylus 15 may be implemented using a pen, pencil, or other mechanical or electrical means of marking the strip chart. Stylus 15 need not be attached to the center of bi-metallic element 19 and may instead be attached to the outside of the element, for example. Bi-metallic element 19 may be implemented using any bi-metallic element mechanism that will actuate stylus 15 in response to temperature, or may be substituted for a temperature transducer taking a form other than a bi-metallic element. It should be appreciated that while element 19 is referred to as a "bi-metallic" element herein for the sake of convenience, element 19 may, but need not be, implemented with precisely two metals. For example, element 19 may alternatively be implemented such that element 19 deforms or deflects in response to temperature using a single metal or a plurality of metals, and the phrase "bi-metallic" is intended to encompass such alternatives. Further, while bi-metallic element 19 comprises a coiled bi-metallic strip in the exemplary implementation of FIG. 1, bi-metallic element 19 may alternatively be an uncoiled strip or assume another shape.

Further, it should be appreciated that although the strip chart recorder described herein is implemented using a bi-metallic element 19 responsive to temperature, the principles described herein may be applied to other types of environmental condition recorders. For example, the stylus 15 of strip chart recorder 1 may be coupled to a transducer responsive to a condition other than temperature, such as humidity, motion, pressure, pH level, dew point, and/or another environmental condition. Thus, while strip chart recorder 1 has been described and illustrated herein as including a temperature-sensitive bi-metallic element 19 according to one exemplary implementation, it should be appreciated that bi-metallic element 19 may be substituted for another temperature or non-temperature transducer in accordance with the invention.

As will be described in more detail connection with FIG. 2, bi-metallic element assembly 21 is initially disposed in bottom portion 3b of housing 3 during assembly of the housing and is not coupled to top portion 3a of housing 3. However, according to an aspect of the invention, bi-metallic element assembly 21 may be attached to top portion 3a at a later time. In the exemplary implementation of FIG. 1, mating features 31 and 33 are used to couple bi-metallic element assembly 21 and top portion 3a of housing 3 to one another. First mating feature 31 is included on top portion 3a of housing 3, and second mating feature 33 is included on arbor 23. As will be discussed in detail in connection with FIGS. 4-5, first mating feature 31 may be adapted to mate with a second mating feature 33 when housing 3 is closed.

A slot 35 is included on top portion 3a of housing to receive dead band 27. When housing 3 is in a closed configuration, dead band 27 is received within slot 35 on top portion 3a of housing 3 and slot 29 on bottom portion 3b of housing 3. When bi-metallic element assembly 21 is coupled to top portion 3a and housing 3 is in an open configuration, dead band 27 is received only within slot 35, which serves to maintain the alignment of dead band 27 with respect to the rest of bi-metallic element assembly 21 and housing 3. Thus, when housing 3 is reclosed, dead band 27 will be aligned such that it may again be received within slot 29. According to one exemplary implementation, slot 35 is offset from slot 29 with respect to the width of housing 3. Hence, when housing 3 is closed, slot 35 and slot 29 may be parallel to one another. Slot 35 may be wider than slot 29, such that slot 35 serves as a gross alignment mechanism and slot 29 serves as a fine alignment mechanism for dead band 27.

Figure 2:
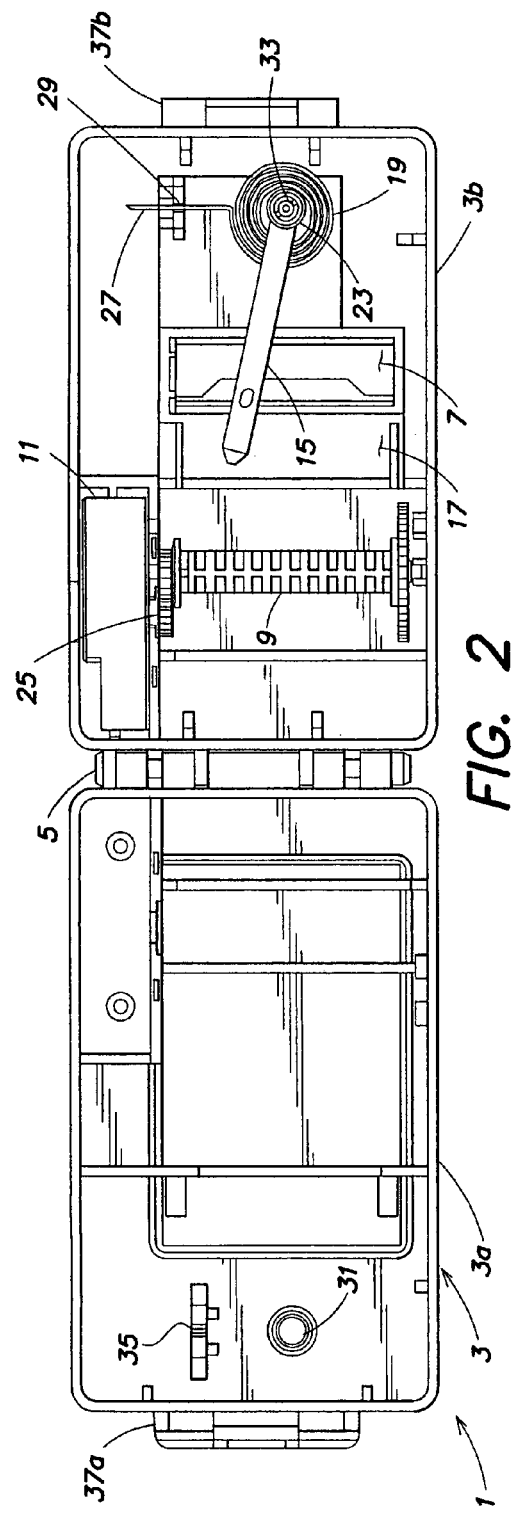
FIG. 2 is a top view of the strip chart recorder of FIG. 1, wherein the strip chart recorder is in an initial open configuration.

FIG. 2 illustrates housing 3 in an initial configuration during assembly of strip chart recorder 1. As described previously, bi-metallic element assembly 21 is initially positioned in bottom portion 3b of housing 3. By initially positioning the bi-metallic element assembly 21 in bottom portion 3b while housing 3 is opened, the functioning and position of bi-metallic element assembly 21 can be verified by observing stylus 15 as it marks the strip chart. In this position, stylus 15 is disposed above chart dispenser 7 and a portion of platen 17, partially obscuring access to the strip chart. As a result, the calibrated configuration of bi-metallic element assembly 21 may be disturbed during removal of the strip chart. Accordingly, as will be described in more detail in FIGS. 4-5, bi-metallic element assembly 21 may be attached to top portion 3a of housing 3 after the initial positioning of the bi-metallic element assembly on the bottom portion 3b of housing 3. According to one exemplary implementation, bi-metallic element assembly 21 is attached to top portion 3a of housing 3 when housing 3 is closed. Once bi-metallic element assembly 21 is attached to top portion 3a of housing 3, bi-metallic element assembly 21 will not obscure the strip chart when housing 3 is opened to expose the strip chart.

Bi-metallic element assembly 21 may be assembled outside of strip chart recorder 1. Before being placed in housing 3, bi-metallic element assembly 21 may be arranged in a calibrated configuration. According to one exemplary calibration method, bi-metallic element assembly 21 may be exposed to a particular reference temperature and allowed to stabilize. The reference temperature may be selected such that it is approximately at the midpoint of the range of temperatures at which the strip chart recorder is operable. For example, the strip chart recorder may be operable between −20° F. and 100° F., and the bi-metallic element 19 and stylus 15 may be coupled together when the ambient temperature of the bi-metallic element assembly is 40° F. At the reference temperature, stylus 15 and bi-metallic element dead band 27 may be positioned with respect to one another and locked in a particular angular relationship. For example, dead band 27 may be oriented at approximately ninety degrees with respect to stylus 15. However, it should be appreciated that other angular relationships may be used. In the exemplary implementation described herein, the position of stylus 15 with respect to dead band 27 may be locked by coupling bi-metallic element 19 and stylus 15 to arbor 23 using glue, mating features, or another attachment mechanism.

Bi-metallic element assembly 21 is then installed in bottom portion 3b of housing 3. Arbor 23 is positioned within a recess in the bottom portion 3b of housing 3, and dead band 27 is positioned within a slot 29 in the bottom portion 3b of housing 3. Slot 29 may be situated such that if the dead band 27 of bi-metallic element 19 is positioned within slot 29 and the longitudinal length of dead band 27 is perpendicular to the longitudinal length of stylus 15, the stylus will initially be aligned at a center portion of platen 17.

Next, housing 3 may be closed by rotating top portion 3a of housing about the axis of hinge 5 until it is positioned on bottom portion 3b of housing 3. Housing 3 may be latched closed by coupling together first and second latch features 37a-b on the outside of housing 3. The closed configuration of housing 3 is shown in FIG. 3.

Figure 3:
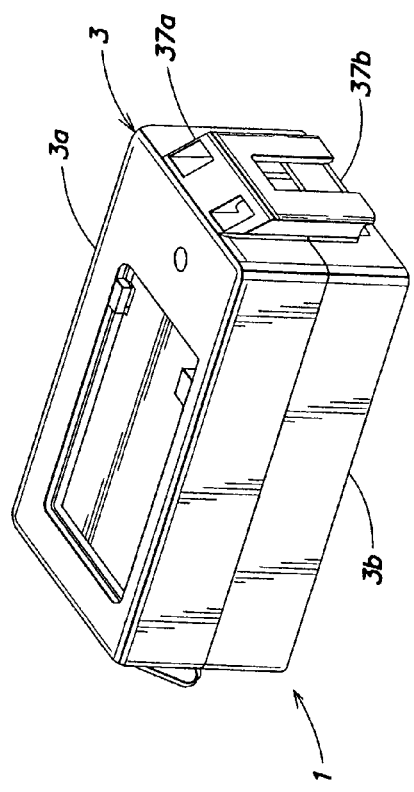
FIG. 3 is a perspective view of the strip chart recorder of FIG. 1, wherein the strip chart recorder is in a closed configuration.
Figure 4:
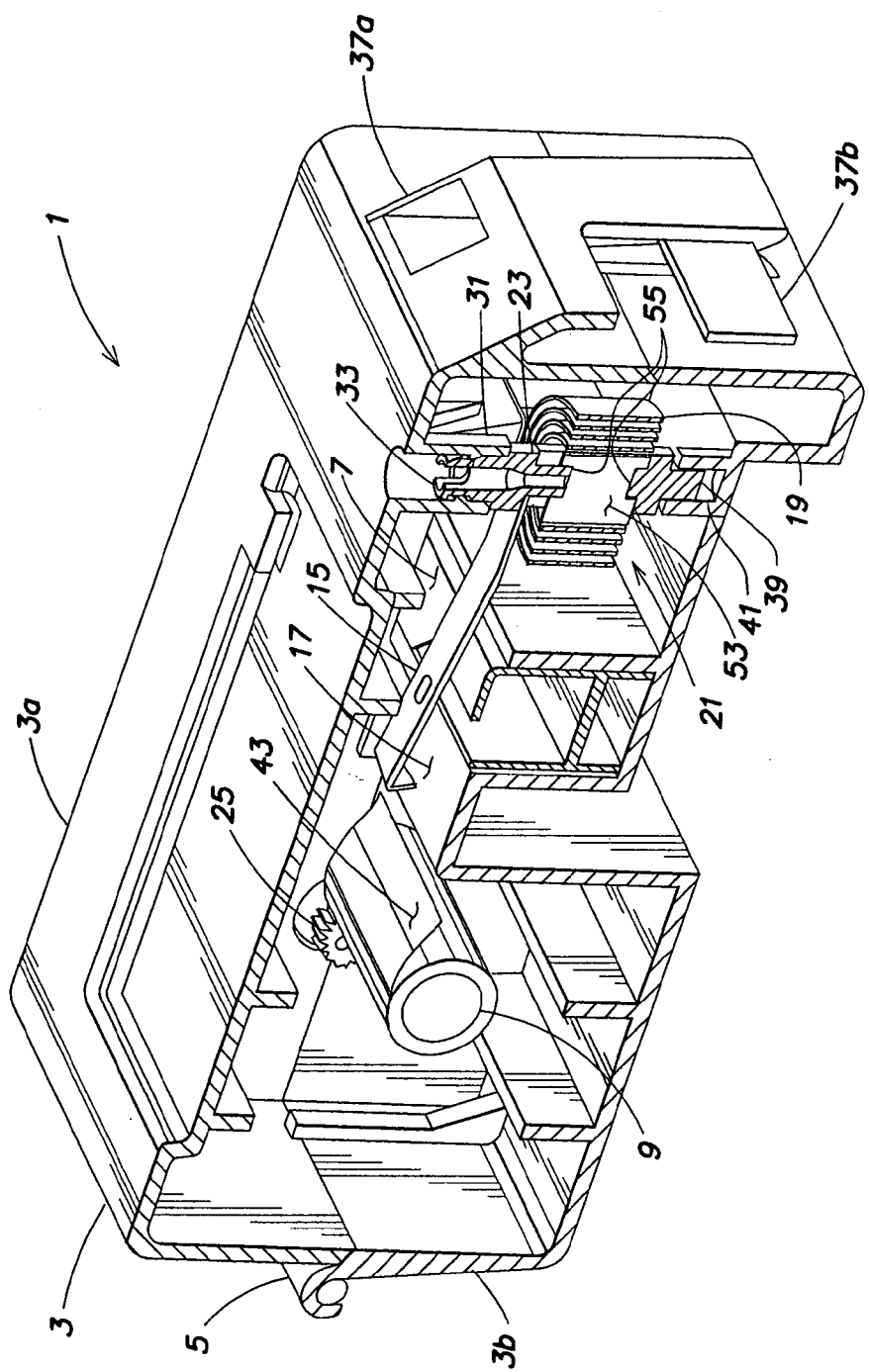
FIG. 4 is a cross-sectional perspective view of the strip chart recorder of FIG. 1, wherein the strip chart recorder is in a closed configuration and includes a strip chart.
Figure 5:
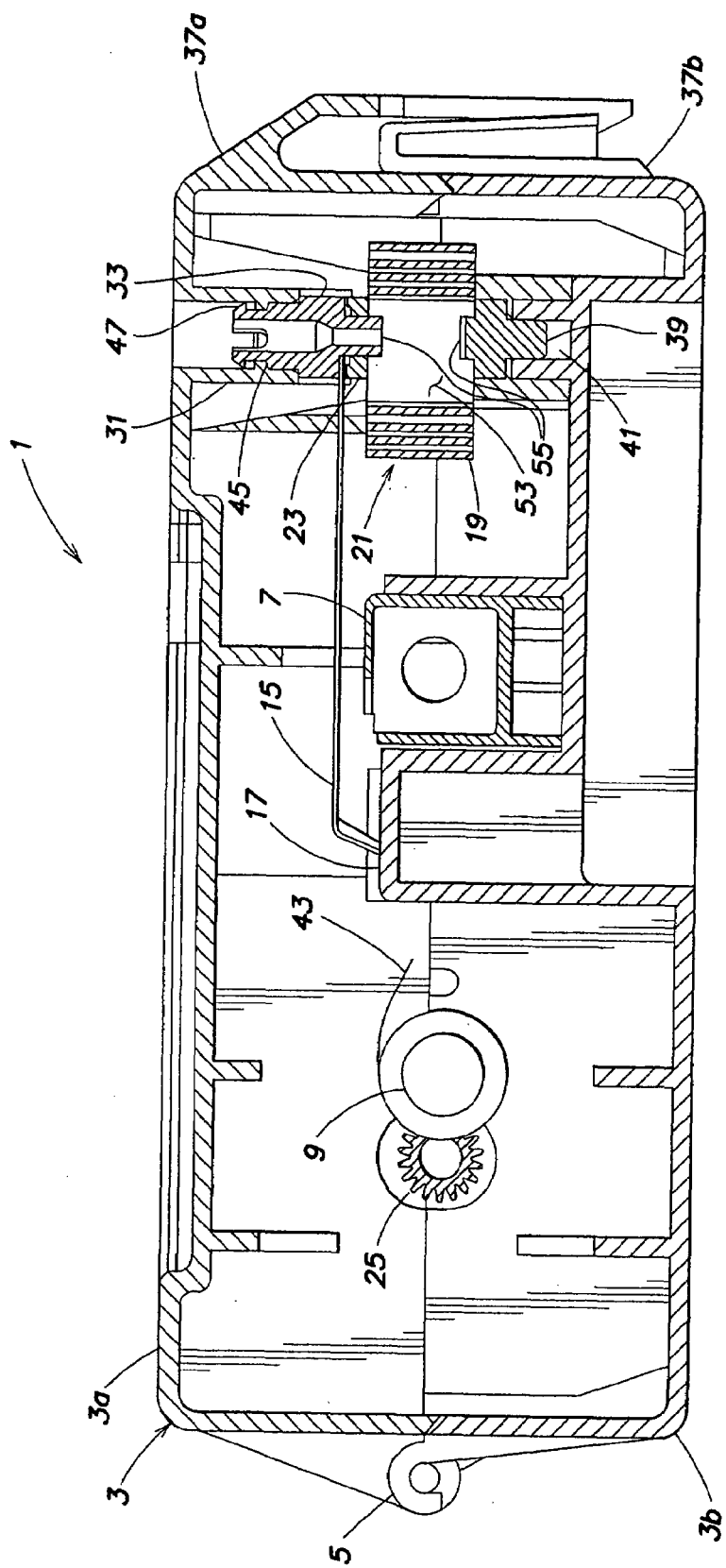
FIG. 5 is a cross-sectional side view of the strip chart recorder of FIG. 1, wherein the strip chart recorder is in a closed configuration and includes a strip chart.

FIGS. 4 and 5 show cross-sectional views of strip chart recorder 1 when housing 3 is in the closed configuration shown in FIG. 3. Specifically, FIGS. 4 and 5 show the mechanism by which bi-metallic element assembly 21 is attached to top portion 3a of housing 3 when housing 3 is closed. Arbor 23 includes a pivot node 39 that is received within a recess 41 in bottom portion 3b of housing 3. Pivot node 39 may freely rotate within recess 41 as bi-metallic element 19 rotates in response to temperature changes. This rotation in turn causes stylus 15, which is coupled to arbor 23, to move over platen 17 and generate markings on strip chart 43 as strip chart 43 passes over platen 17. Arbor 23 also includes a second mating feature 33 that mates with a first mating feature 31 on top portion 3a of housing 3. In the exemplary implementation shown, second mating feature 33 includes a flange 47 that may be inserted past a collar 45 of first mating feature 31 and thereby held in place. Flange 47 may include a chamfer and/or a seam to facilitate inserting flange 47 past collar 45. First and second mating features 31 and 33 are one example of a mechanism that may be used to lock bi-metallic element assembly 21 to top portion 3a of housing 3. However, it should be appreciated that other types of mechanisms may alternatively be used. For example, an adhesive, a screw system, a snap system, or other mating system may alternatively be used.

FIGS. 4 and 5 also illustrate the attachment of bi-metallic element 19 and stylus 15 to arbor 23. As shown, a flat inner portion 53 of bi-metallic element 19 passes through arbor 23 and is held in place by notches 55 in the arbor that mate with corresponding notches in the inner portion 53 of bi-metallic element 19. Stylus 15 is secured between a main portion of arbor 23 and second mating feature 33. For example, 15 stylus may comprise an opening through which main portion of arbor 23 and second mating feature 33 are joined.

Strip chart recorder 1 may be used to record temperature changes when housing 3 is in the configuration shown in FIGS. 4 and 5. According to one exemplary implementation, strip chart recorder 1 is used to record the temperature conditions of a item or group of items during transit. Such items may be temperature sensitive, such as products intended for human use or consumption (e.g., foods and food-related products, beverages, medicines, cosmetics, etc.). Strip chart 43 may indicate whether the item or items have been exposed to undesirable temperature conditions (e.g., inadvertent freezing or thawing, extreme heat or cold, time spent outside of a particular desirable temperature range, undesirable temperature cycles or fluctuations, etc.).

Figure 6:
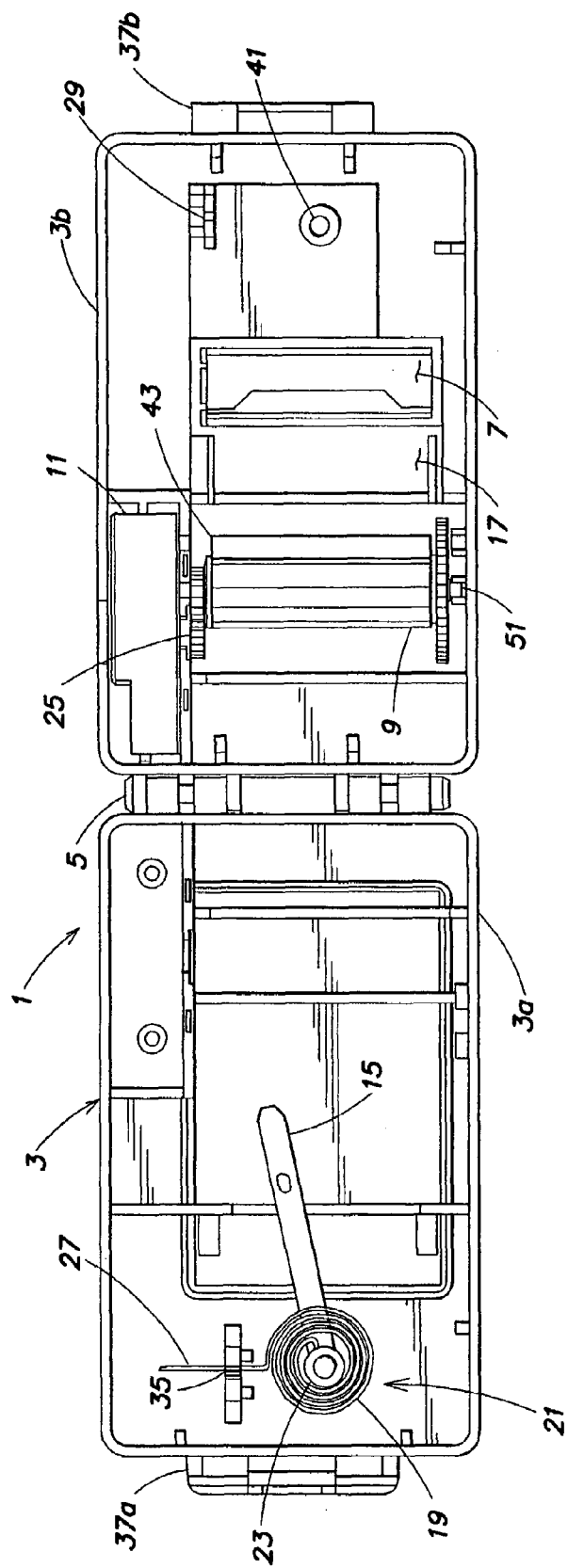
FIG. 6 is a top view of the strip chart recorder of FIG. 1, wherein the strip chart recorder is in a second open configuration and includes a strip chart.
Figure 7:
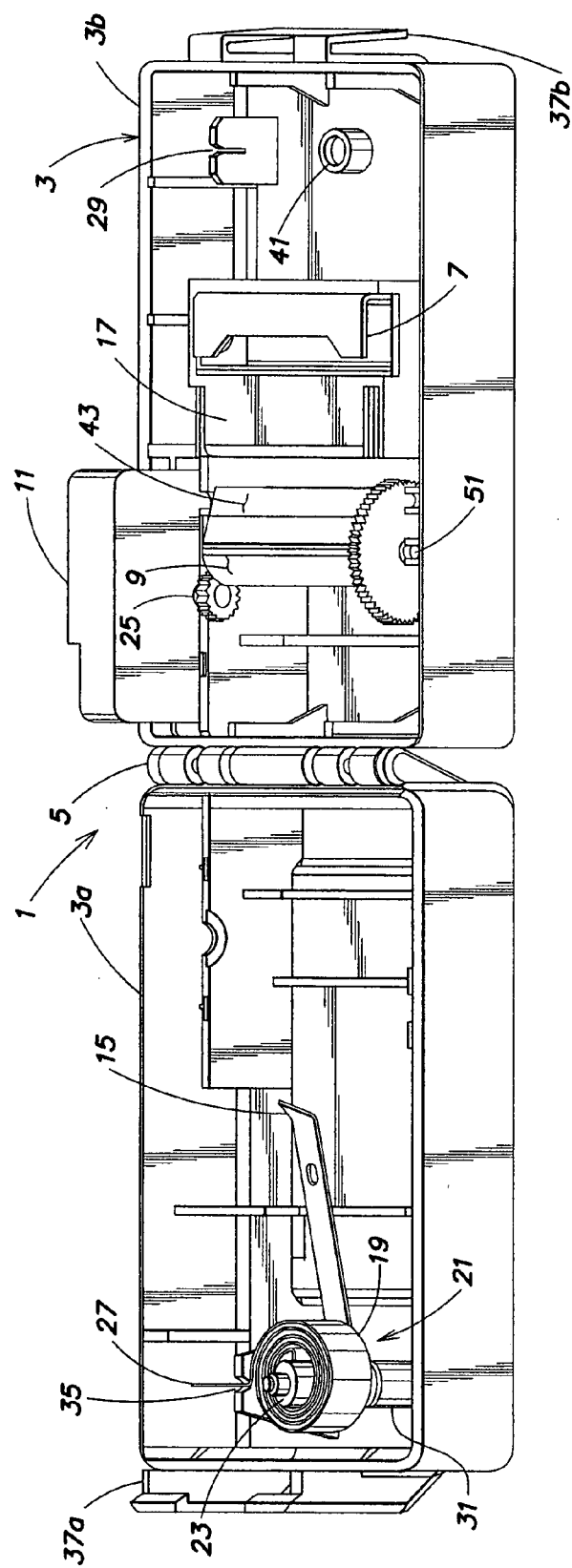
FIG. 7 is a perspective view of the strip chart recorder of FIG. 1, wherein the strip chart recorder is in a second open configuration and includes a strip chart.

Thereafter, a user may open housing 3 to remove strip chart 43 or a portion thereof. When housing 3 is opened, strip chart recorder 1 will appear as shown in the top and perspective views of strip chart recorder 1 illustrated in FIGS. 6 and 7, respectively. FIGS. 6 and 7 show bi-metallic element assembly 21 coupled to top portion 3a of housing 3. Arbor 23 is coupled to top portion 3a by first mating feature 31 and second mating feature 33, as was described in connection with FIGS. 5 and 6. Dead band 27 is supported within slot 35. With bi-metallic element assembly 21 disposed in the top portion 3a of the housing 3, unobstructed access is permitted to strip chart 43. The entire strip chart 43 may be removed along with spool 9, if desired. To remove spool 9, an end of spool 9 may be lifted from its position in recess 51. Alternatively, only a portion of strip chart 43 may be removed.

It may be desirable to verify the accuracy of the recorded data. At the end of the trip, a post-trip calibration may be performed on strip chart recorder 1. The post-trip calibration may be used to verify the indication of temperature conditions of strip chart 43 by confirming the correlation between the markings made by stylus 15 and temperature conditions. To perform a post-trip calibration, a new strip chart may be loaded into housing 3 of strip chart recorder 1, and the strip chart recorder may be exposed to a reference temperature. Strip chart 43 is then reviewed to determine whether the recorded data comports with what would be expected that reference temperature, which indicates whether strip chart recorder 1 is properly calibrated.

The strip chart recorder 1 described herein may be constructed in various ways. According to one example, housing 3 is formed by injection molding. To reduce the number of separate parts required to construct strip chart recorder 1, other aspects of the recorder may be integrally formed with housing 3. For example, any combination of hinge 5, latch 37, chart dispenser 7, recess 41 and first mating feature 31 may be molded together with housing 3.

It should be appreciated that the systems and methods described herein for moving the stylus and/or bi-metallic element of the strip chart recorder so that it does not obstruct the strip chart during removal of the strip chart are merely exemplary and that other systems and methods may alternatively be used. For example, the stylus and/or bi-metallic element may be coupled to the top portion of the housing using a bracket that is not initially coupled to the stylus and/or bi-metallic element, rather than an arbor or other mechanism coupled to the stylus and/or bi-metallic element. The bracket may be coupled to a top portion of the housing. As another example, the stylus and/or bi-metallic element may be entirely removed from the housing, rather than being merely relocated within the housing, before the strip chart is accessed. For example, an access door or other panel may be provided in the housing described herein to which the stylus and/or bi-metallic element may be mounted. The access door or panel may be removed from the housing or opened so that the stylus and/or bi-metallic element are external to the housing. In this manner, the stylus and/or bi-metallic element may be moved to allow unobstructed access to the strip chart while maintaining the calibration location of the stylus and/or bi-metallic element to the strip chart.

Having thus described several illustrative embodiments of the invention, various alterations, modifications, and improvements will readily occur to those skilled in the art. Such alterations, modifications, and improvements are intended to be within the spirit and scope of the invention. While some examples presented herein involve specific combinations of functions or structural elements, it should be understood that those functions and elements may be combined in other ways according to the present invention to accomplish the same or different objectives. In particular, acts, elements and features discussed in connection with one embodiment are not intended to be excluded from a similar or other roles in other embodiments. Accordingly, the foregoing description is by way of example only, and is not intended as limiting.

What is claimed is:

1. A strip chart recorder, comprising:
    a housing comprising top and bottom portions, the top portion of the housing comprising a first mating feature;
    a bi-metallic element assembly initially disposed in bottom portion of the housing and comprising a second mating feature; and
    a strip chart positioned on the bottom portion of the housing;
    wherein the first and second mating features are adapted to engage each other in response to the housing being closed, and wherein the first and second mating features are engaged such that the bi-metallic element assembly attaches to the top portion of the housing and remains attached to the top portion when the housing is opened.

2. The strip chart recorder of claim 1, wherein the bi-metallic element assembly comprises a stylus and a bi-metallic element.

3. The strip chart recorder of claim 2, wherein the stylus and bi-metallic element are coupled by an arbor that comprises the second mating feature.

4. The strip chart recorder of claim 2, wherein the bi-metallic element assembly is arranged in a calibrated configuration at a calibration temperature.

5. The strip chart recorder of claim 2, wherein the bi-metallic element comprises a dead band, and wherein the stylus is fixed at an angle of approximately 90 degrees with respect to the dead band of the bi-metallic element.

6. The strip chart recorder of claim 1, wherein the first and second mating features are adapted to remain engaged when the housing is opened.

7. The strip chart recorder of claim 1, wherein the first and second mating features are adapted to retain the bi-metallic element assembly in a calibrated configuration.

8. The strip chart recorder of claim 7, wherein the bi-metallic element assembly comprises a stylus having a central axis and a bi-metallic element comprising a dead band and wherein the first and second mating features area adapted to retain an angular relationship between the axis of stylus and the dead band.

9. The strip chart recorder of claim 2, wherein the bi-metallic element comprises a plurality of metals.

10. The strip chart recorder of claim 1, further comprising a holder disposed on the bottom portion of the housing, wherein the holder is adapted to hold the bi-metallic element assembly in a calibrated configuration.

11. A strip chart recorder, comprising:
a housing comprising top and bottom portions;
a bi-metallic element assembly initially disposed at a first position in bottom portion of the housing;
a strip chart positioned on the bottom portion of the housing; and
means for moving the bi-metallic element assembly from the first position in which the bi-metallic element assembly at least partially obstructs access to the strip chart to a second position in which the bi-metallic element assembly does not obstruct access to the strip chart while maintaining a calibrated configuration of the bi-metallic element assembly.

12. A strip chart recorder, comprising:
a housing comprising top and bottom portions;
a bi-metallic element assembly; and
a strip chart positioned on the bottom portion of the housing;
wherein the strip chart recorder is adapted to assume a first configuration in which the housing is open and the bi-metallic element assembly is held in a calibrated configuration on the bottom portion of the housing; a second configuration in which the housing is closed and the bi-metallic element assembly is attached to the top portion of the housing in the calibrated configuration; and a third configuration in which the housing is open and the bi-metallic element assembly is attached to the top portion of the housing in the calibrated configuration.

13. A strip chart recorder, comprising:
a housing comprising top and bottom portions, the top portion of the housing comprising a first mating feature;
a bi-metallic element assembly initially disposed in bottom portion of the housing and comprising a second mating feature; and
a strip chart positioned on the bottom portion of the housing;
wherein the first and second mating features are adapted to automatically attach the bi-metallic element assembly to the top portion of the housing in response to the housing being closed such that the bi-metallic element assembly remains attached to the top portion when the housing is opened.

* * * * *